No. 863,499. PATENTED AUG. 13, 1907.
N. BARRY, JR., W. R. WATERS & A. F. KEFFLO.
SHELL GRINDING MACHINE.
APPLICATION FILED DEC. 3, 1906.
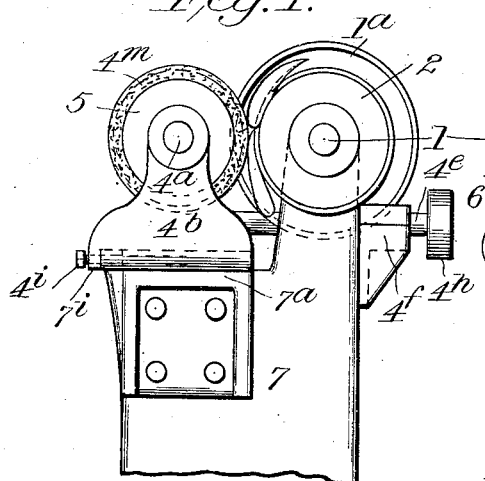
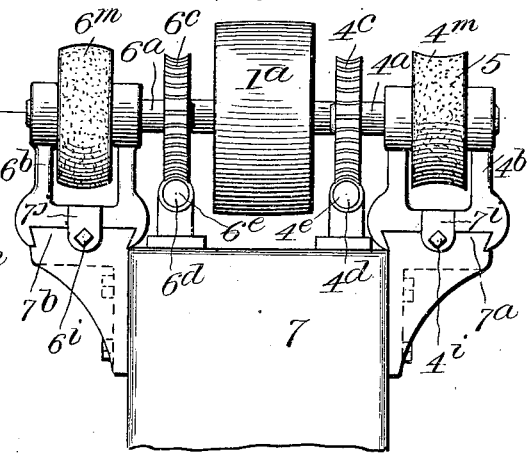
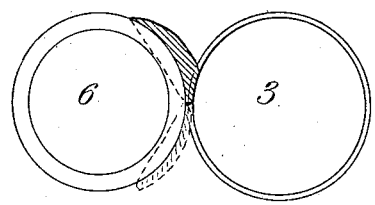
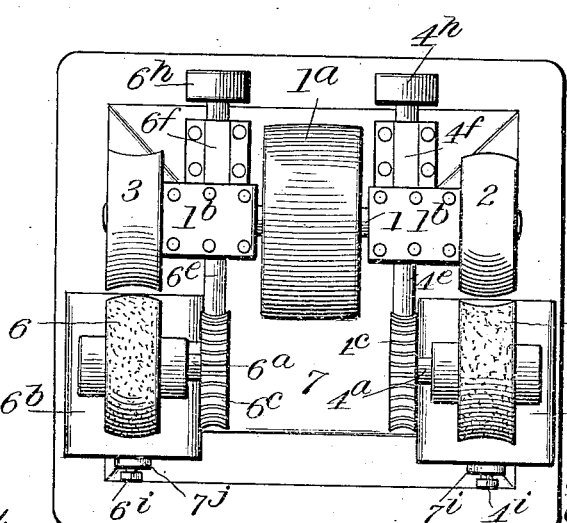

UNITED STATES PATENT OFFICE.

NICHOLAS BARRY, JR., WILLIAM R. WATERS, AND ALBERT F. KEFFLO, OF MUSCATINE, IOWA, ASSIGNORS TO BARRY MANUFACTURING COMPANY, OF MUSCATINE, IOWA.

SHELL-GRINDING MACHINE.

No. 863,499.   Specification of Letters Patent.   Patented Aug. 13, 1907.

Application filed December 3, 1906. Serial No. 346,174.

To all whom it may concern:

Be it known that we, NICHOLAS BARRY, Jr., WILLIAM R. WATERS, and ALBERT F. KEFFLO, of Muscatine, Iowa, have invented certain new and useful Improvements in Shell-Grinding Machines; and we hereby declare that the following is a full, clear, and exact description thereof, reference being had to the accompanying drawings, which form part of this specification.

This invention is an improvement in machines for manufacturing so-called pearl buttons from mussel shells, and is designed for grinding the shells to approximately the contour of the inner surface of the web portion of the shell, by removing the projecting hinge and ridge portions thereof at the inner side of the shell and by removing the excessive thickness of the exterior portion of the shell adjacent the hinge and ridge portions, thus reducing the shell to approximately uniform thickness and concavo-convex or parti-spherical form, in which condition they are best adapted for the subsequent cutting of the blanks therefrom, either by hand or by machine.

The shells which the machine is particularly designed to operate on are the large mussel shells found in the Mississippi river and its tributaries which are commonly used in the manufacture of pearl buttons. Heretofore only the web portion of the shell has been utilized for making the buttons, because the hinge and ridge portions were too thick to be useful if cut, and furthermore the blanks produced from the crude shells are irregular in thickness and shape.

The present invention is designed to grind the shells internally and externally, as above stated, to reduce them to a concavo-convex form and of substantially uniform thickness, so that the blanks cut from these prepared shells will be substantially uniform in thickness and can be much more readily and easily made up into perfect buttons.

The invention will be fully understood from the accompanying drawings and the claims set forth the features of the machine for which protection is desired.

In said drawings—Figure 1 is a side elevation of the upper portion of the complete machine; Fig. 2 is a front view thereof; Fig. 3 is a plan view thereof; Fig. 4 is a detail view illustrating the mode of grinding the convex or outer portion of the shells; Fig. 5 is a sectional view of a shell before grinding; Fig. 6 is a similar view of said shell after being passed through the concave grinder; and, Fig. 7 is a view of the shell after having passed through both the concave and convex grinders, that is, after it has been ground both internally and externally to uniform thickness and parti-spherical or concavo-convex form.

The machine comprises the main shaft 1 which is provided with a pulley $1^a$ which can be driven from any suitable driving-shaft. This shaft is journaled in boxes $1^b$ at opposite sides of the pulley and has on its outer end the grinding-disks 2 and 3, the former of which has a convex periphery and the latter a concave periphery, these disks 2 and 3 being preferably formed of carborundum or other suitable very hard abrasive material.

Opposite the convex-surfaced grinder 2 is a concave feed-wheel 5 which is mounted upon a stub-shaft $4^a$ journaled in a bracket $4^b$, slidably mounted upon the guides $7^a$ of the main frame 7, so that the wheel 4 can be moved toward or from the grinder 2. The wheel 4 is rotated at a very slow speed by means of a worm-gear $4^e$ engaging a worm-gear $4^d$ on a countershaft $4^c$ which is journaled in suitable bearings $4^f$ attached to the frame 7, and has on its rear end a small pulley $4^h$ which can be belted to an overhead shaft or other suitable driver.

Opposite the concave grinder 3 is a convex feed-wheel 6 which is mounted on a stub-shaft $6^a$ journaled in a bracket $6^b$ slidably mounted upon the guides $7^b$ on the frame 7. On the shaft $6^a$ is a worm-gear $6^e$ meshing with a worm $6^d$ on a countershaft $6^e$ journaled in suitable brackets $6^f$ on frame 7 and provided with a pulley $6^h$ on its outer end which can be belted to any suitable overhead driver.

The bracket $4^b$ can be adjusted to move the wheel to or from the grinder 2 by means of the adjusting bolt $4^i$ tapped through a lug $7^i$ on the main frame and engaging bracket $4^b$. Similarly, bracket $6^b$ can be adjusted by bolt $6^i$ tapped through a lug $7^j$ on the main frame and engaging the bracket $6^b$.

It will be seen from the drawings that the feed-wheels 4 and 6 are adjustable to and from the relative grinders 2 and 3 and the parts can be set so as to grind the shells to any desired thickness. The grinders 2 and 3 are to be rotated at very high speed, while the feed-wheels 4 and 6 are rotated at a very slow speed so as to control the passage of the shell between the grinders and the feed-wheels, and to detain the shell until it is properly ground; and for this reason I prefer to use worm-gearing to rotate the feed-wheels 4 and 6 as such gearing will enable me to rotate them very slowly and at the same time will prevent the pull on the shell by the abrasive action of the grinding wheel accelerating the movement of the feed-wheel. I find it preferable to face these feed-wheels 4 and 6 with a frictional material—rubber, compressed fiber, rawhide or other suitable material—as indicated at $4^m$ and $6^m$ in the drawings. I have found rubber very desirable as the shells have a tendency to cling thereto and thus are detained by the feed-wheel until they are properly ground by the grinding-disks.

Our machine can be used by one operator or by two operators. When one operator uses the machine, the shells are first passed, preferably, between the grinder 2 and the feed-wheel 4 and ground internally and then passed between the grinder 3 and feed-wheel 6 and ground externally.

In grinding the shells, they are preferably fed thick or hinge end first, as indicated in the drawings. The shells are then passed first between the convex-surfaced grinding-disk 2 and the concave-surfaced feed-wheel 4. The high speed of the grinding-disk and the retarding action of the feed-wheel 4 causes the shell to naturally assume the position indicated in dotted lines in Fig. 1, and lay over with its concave face against the periphery of the grinding-disk or wheel and cling thereto until it has passed between the wheels and falls clear thereof. The reverse action occurs when the shells are fed between the concave-surfaced grinder 3 and the convex-surfaced feed-wheel 6, and in passing between this feed-wheel and grinding-disk, the shells will assume the position shown in Fig. 4, the previously ground surface of the shell lying against the convex periphery of the feed-wheel 6 and practically adhering closely thereto until the shell has passed between the grinding-disk and feed-wheel. The grinder 2 and feed-wheel 4 in action remove the inner portions of the hinge or ridge of the shell and give it practically a uniform concave surface, as indicated in Fig. 6. The action of the grinding-disk 3 and the feed-wheel 6 removes the thick outer portion of the shell and reduces it to approximately a uniform thickness conforming to the interior, the interior being ground concave and the exterior convex so that the resultant product is a concavo-convex shell of substantially uniform thickness as indicated in Fig. 7, resembling approximately the segment of a hollow sphere. In this condition the shell is best suited for subsequent treatment, either by simultaneously cutting the blanks therefrom, or by the ordinary blank-cutting operations performed by the ordinary hand-machines customarily employed in cutting blanks from the rough shell.

The resultant blanks from shells ground in my machine will be of uniform thickness and of much better quality than have heretofore been obtainable. Less subsequent treatment is required to reduce blanks cut from the prepared shells into perfect buttons and a much larger percentage of blanks is obtainable from these prepared shells than from the unprepared shells, because hitherto it has been impossible to make buttons from the hinge and ridge portions of such shells.

Having described our invention what we claim as new and desire to secure by Letters Patent is:—

1. In a machine for grinding mussel shells, the combination of a grinding disk and an opposed feed wheel, and driving mechanism arranged and proportioned to rotate the grinding disk and feed wheel in opposite directions and at relatively high and low speeds respectively.

2. In a machine for grinding mussel shells, the combination of a grinding disk and an opposed feed-wheel, said feed wheel having a frictional surface adapted to retard the passage of the shells between the wheels, and driving mechanism arranged and proportioned to rotate the grinding disk and feed wheel in opposite directions and at relatively high and low speeds respectively.

3. The combination in a shell grinding machine, of a grinding disk having a concave periphery with an adjacent co-acting feed wheel having a convex periphery, and driving mechanism arranged and proportioned to rotate the grinding disk and feel wheel in opposite directions and at relatively high and low speeds respectively.

4. In a shell grinding machine, the combination of a grinding disk, and a feed wheel opposite and co-acting with said disk, said feed wheel having a frictional surface, and one of said wheels having a concave and the other a convex periphery, and driving mechanism arranged and proportioned to rotate the grinding disk and feed wheel in opposite directions and at relatively high and low speeds respectively.

In testimony that we claim the foregoing as our own, we affix our signatures in presence of two witnesses.

NICHOLAS BARRY, JR.
WILLIAM R. WATERS.
ALBERT F. KEFFLO.

In presence of—
WILLIAM R. JAYNE,
ARTHUR E. DOWELL.